US006510753B1

(12) United States Patent
Blais

(10) Patent No.: US 6,510,753 B1
(45) Date of Patent: Jan. 28, 2003

(54) METHOD AND APPARATUS FOR CYCLE TESTING A MOTOR VEHICLE CLOSURE PANEL

(75) Inventor: Donald J Blais, Roseville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/547,662

(22) Filed: Apr. 12, 2000

(51) Int. Cl.$^7$ ................................................ F16H 27/02
(52) U.S. Cl. .......................................... 73/865.9; 73/808
(58) Field of Search ........................ 73/7, 865.9, 865.3, 73/808, 810, 828

(56) References Cited

U.S. PATENT DOCUMENTS 4,644,692 A * 2/1987 Schindehutte
5,819,584 A * 10/1998 Evans

* cited by examiner

Primary Examiner—Robert Raevis
(74) Attorney, Agent, or Firm—Thomas A. Jurecko

(57) ABSTRACT

An apparatus for cycle testing a closure panel of a motor vehicle. The closure panel is coupled to a body of the motor vehicle for articulation about the pivot axis. The closure panel includes first and second laterally spaced apart edges. The first edge is adjacent the pivot axis of the second edge and carries a latch for releasable attachment to the body. The apparatus for cycle testing includes a first linear actuator, a tensioner, and a first flexible coupler. The first linear actuator has a guide track and a carriage mounted to the guide track for repeated movement in alternative directions along a first translation axis between first and second positions. The tensioner is coupled to the carriage of the first linear actuator for movement therewith. The first flexible coupler is attached to the tensioner and coupled to the closure panel adjacent the second edge. The tensioner is operative for maintaining a tension in the first flexible coupler as the carriage is cycled between the first and second positions.

12 Claims, 5 Drawing Sheets

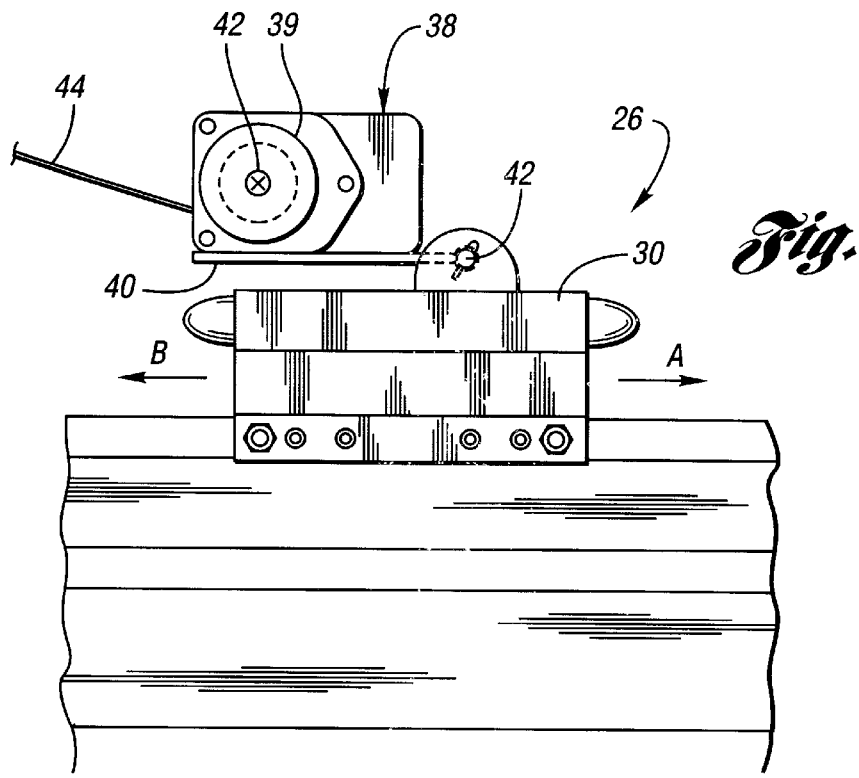

*Fig. 5*

| PROVIDING A FIRST LINEAR ACTUATOR AND A GUIDE TRACK AND A CARRIAGE MOUNTED TO THE GUIDE TRACK FOR REPEATED MOVEMENT IN ALTERNATIVE DIRECTIONS ALONG THE FIRST TRANSLATIONAL AXIS BETWEEN FIRST AND SECOND POSITIONS | 110 |

↓

| INTERCONNECTING A MOTOR VEHICLE CLOSURE PANEL TO THE CARRIAGE OF THE FIRST LINEAR ACTUATOR WITH A FIRST FLEXIBLE COUPLER | 120 |

↓

| REPEATEDLY CYCLING THE CARRIAGE OF THE FIRST LINEAR ACTUATOR BETWEEN THE FIRST AND SECOND POSITIONS | 130 |

↓

| MAINTAINING A TENSION IN THE FIRST FLEXIBLE COUPLER AS THE CARRIAGE OF THE FIRST LINEAR ACTUATOR IS CYCLED BETWEEN THE FIRST AND SECOND POSITIONS | 140 |

*Fig. 6*

METHOD AND APPARATUS FOR CYCLE TESTING A MOTOR VEHICLE CLOSURE PANEL

BACKGROUND OF THE INVENTION

1. Field of the Invention

The present invention generally relates to motor vehicles. More particularly, the present invention relates to a method and apparatus for cycle testing a vehicle closure panel.

2. Discussion

During the manufacturing process, especially during prototyping and early production phases of development of a new motor vehicle, it is commonly necessary to cycle test various functional aspects of the vehicle. For example, it is necessary to cycle test the operation of closure panels such as door assemblies, liftgates and the like. Conventional cycle testing involves outfitting prototype version of a vehicle with custom linkages and supports throughout its passenger compartment. This outfitting enables automated operation of the vehicle door assembly over an extended period of time.

While known methods of cycle testing vehicle closure panels have proven to be successful for assessing durability issues, they are all associated with drawbacks. Most notably insofar as the subject invention is concerned, the known custom linkages and supports are time consuming to design and assemble. The custom testing structure which must be designed, constructed and installed within the prototype vehicle's passenger compartment requires use of a prototype vehicle for an extended period of time. The conventional custom testing structure for a closure panel typically includes individual, uniquely-designed linkages and structural supports assembled within the vehicle. Because of this excessive outfitting of testing linkages within the prototype vehicle, testing teams must typically have the prototype vehicle for several months. Consequently, additional prototype vehicles must be constructed to allow simultaneous testing of other mechanical systems of the vehicle.

Thus, it remains a need in the art to provide a cycle testing apparatus for a motor vehicle closure panel which can be more easily and quickly designed and set up.

SUMMARY OF THE INVENTION

It is an object of the present invention to provide a method and apparatus for cycle testing a vehicle closure panel with improved reliability.

It is another object of the present invention to provide an method and apparatus for cycle testing a vehicle closure panel which moves the closure panel between open and closed positions with flexible couplers or belts.

It is a more particular object of the present invention to provide a method and apparatus for cycle testing a vehicle closure panel which incorporates a flexible belt that is coiled on a tensioner.

In one form, the present invention provides an apparatus for cycle testing a closure panel of a motor vehicle. The closure panel is coupled to a body of the motor vehicle for articulation about the pivot axis. The closure panel includes first and second laterally spaced apart edges. The first edge is adjacent the pivot axis. The second edge carries a latch for releasable attachment to the body. The apparatus for cycle testing includes a first linear actuator, a tensioner, and a first flexible coupler. The first linear actuator has a guide track and a carriage mounted to the guide track for repeated movement in alternative directions along a first translation axis between first and second positions. The tensioner is coupled to the carriage of the first linear actuator for movement therewith. The first flexible coupler is attached to the tensioner and coupled to the closure panel adjacent the second edge. The tensioner is operative for maintaining a tension in the first flexible coupler as the carriage is cycled between the first and second positions.

In another form, the present invention provides a method for cycle testing a liftgate of a motor vehicle between an open position and a closed position. The liftgate is coupled to the body of the motor vehicle for articulation about a horizontal pivot axis. The method includes the general steps of:

(1) providing a first linear actuator having a guide track and a carriage mounted to the guide track for repeated movement in alternative directions along a first translation axis between first and second positions;

(2) interconnecting a lower edge of the liftgate to the carrier of the first linear actuator with a first flexible coupler;

(3) repeatedly cycling the carriage of the first linear actuator between the first and second positions; and (4) maintaining a tension in the first flexible coupler as the carriage of the first linear actuator is cycled between the first and second positions.

BRIEF DESCRIPTION OF THE DRAWINGS

The present invention will become more fully understood from the detailed description and the accompanying drawings, wherein:

FIG. 5 is an enlarged side view of a portion of the apparatus of the present invention.

FIG. 6 illustrates the general steps of a preferred method of the present invention.

DETAILED DESCRIPTION OF THE PREFERRED EMBODIMENTS

Figure 1:
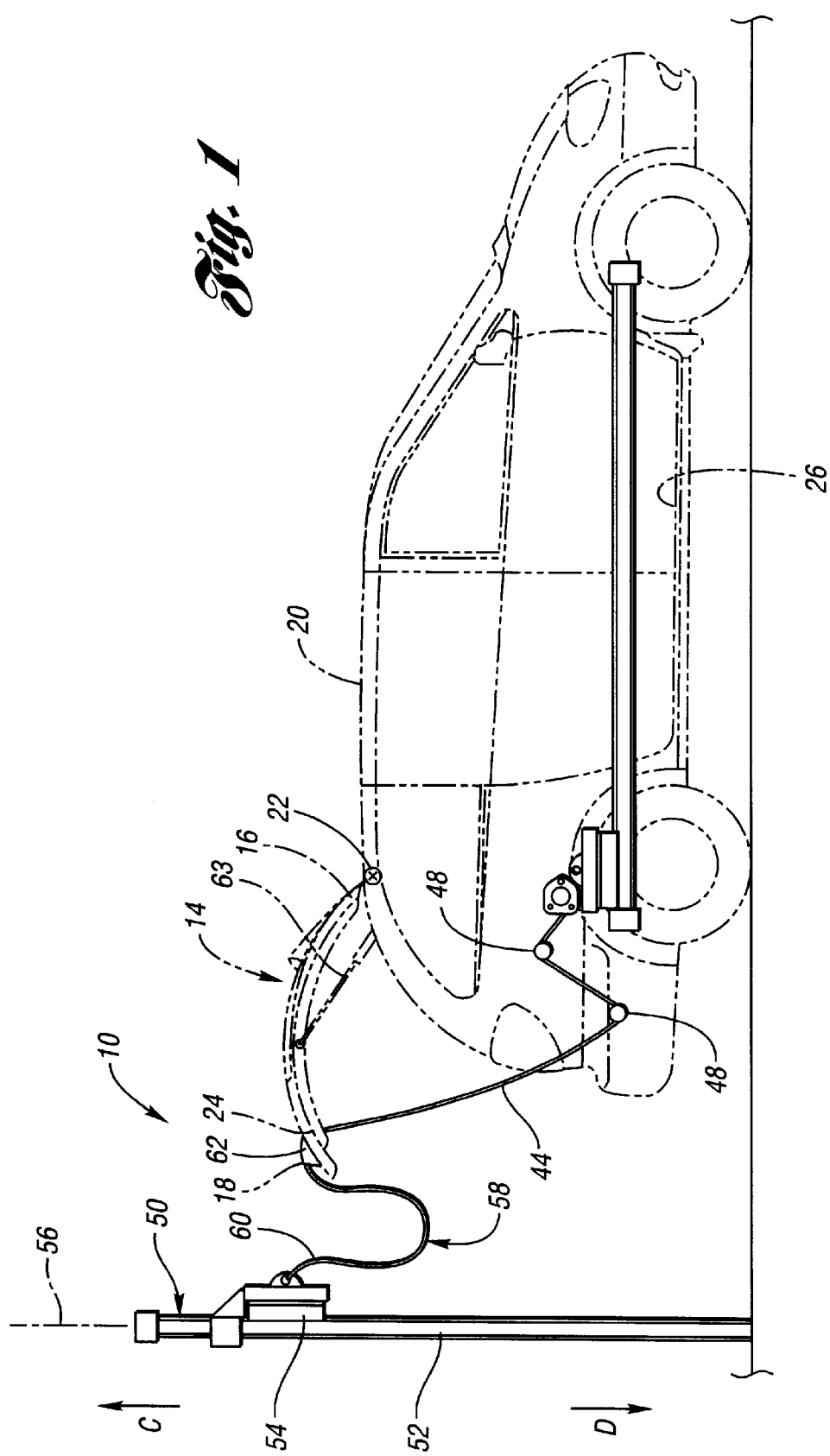
FIG. 1 is a side view of an apparatus for cycle testing a closure panel of a motor vehicle constructed in accordance with the teachings of the preferred embodiment of the present invention, the apparatus 10 shown operatively associated with an exemplary motor vehicle, a liftgate of the motor vehicle shown articulated to an open position.
Figure 2:
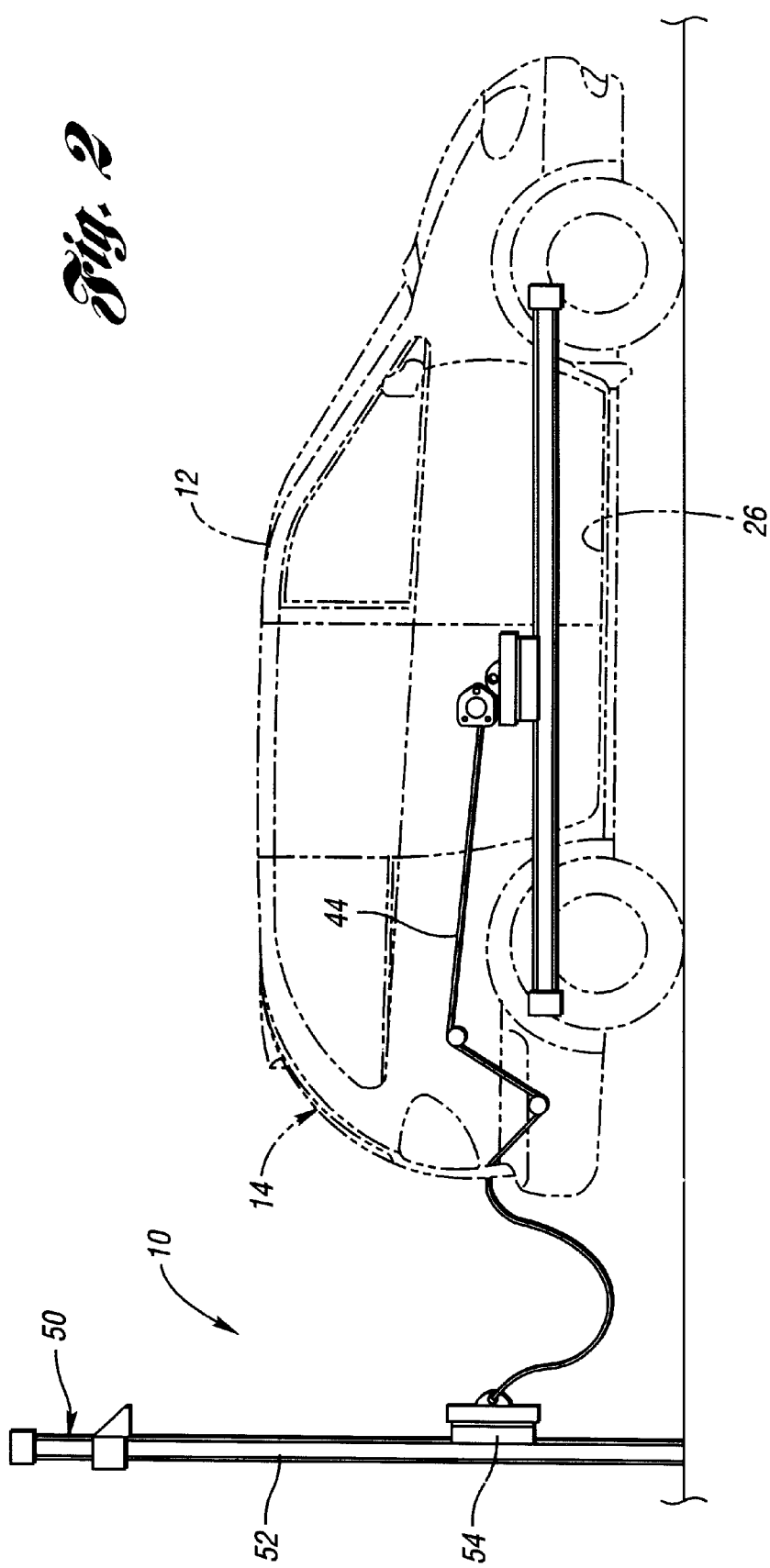
FIG. 2 is a side view similar to FIG. 1, illustrating the liftgate of the motor vehicle articulated to a closed position.

With initial reference to environmental views of FIGS. 1 and 2, an apparatus for cycle testing a closure panel of a motor vehicle is illustrated and generally identified at reference numeral 10. The apparatus of the present invention 10 is shown operatively associated with an exemplary motor vehicle 12. The exemplary motor vehicle 12 is illustrated as a minivan having a closure panel 14 in the form of a liftgate. The apparatus 10 is specifically adapted for cycle testing of the liftgate 14. It will become apparent to those skilled in the art that the teachings of the present invention are not limited to the particular vehicle 12 shown in the drawings. In the same regard, it will be understood that the teachings of the present invention are applicable for other vehicle closure panels, including but not limited to conventional passenger doors which pivot about a vertical axis, sliding doors and the like.

Prior to turning to the specific configuration and operation of the apparatus 10 of the present invention, a brief understanding of the exemplary use environment shown throughout the drawings is warranted. In a conventional manner, the liftgate 14 includes a first edge or upper edge 16 and a second edge or lower edge 18. The liftgate 14 is coupled to a body 20 of the motor vehicle 12 adjacent the upper edge 16 for articulation about a horizontal pivot axis 22. The liftgate 14 is articulable between a closed position (shown in FIG. 2) and an open position (shown in FIG. 1). A latch 24 is carried by the liftgate 14 proximate to the lower edge 18 for releasably engaging the body of the motor vehicle 12. The motor vehicle 12 is preferably a body-in-white vehicle without a completed interior. It will be clearly understood that the motor vehicle 12 is conventional in construction insofar as the present invention is concerned.

Figure 3:
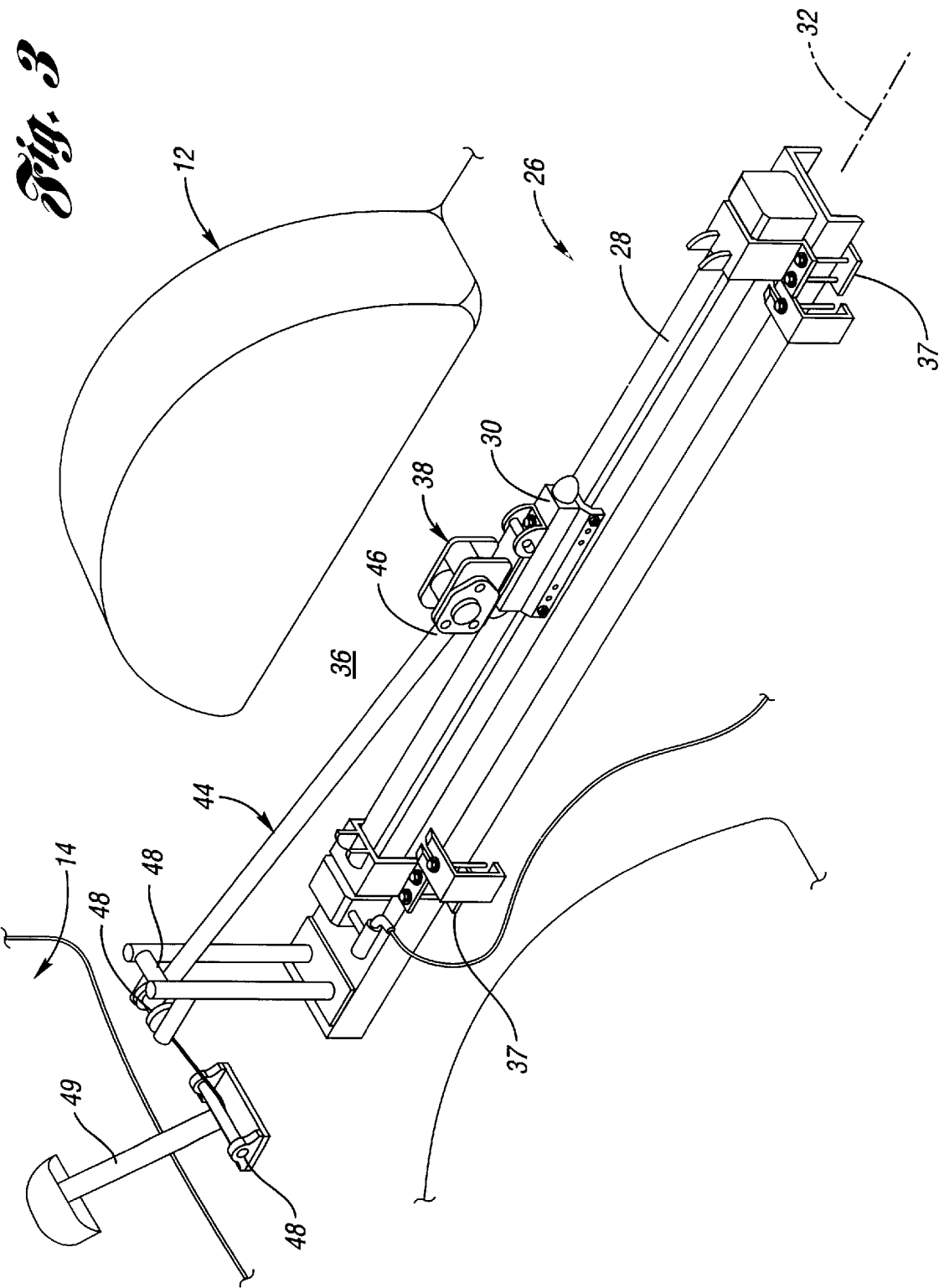
FIG. 3 is an enlarged perspective view of a portion of the apparatus 10 of the present invention shown mounted within an interior of the motor vehicle, a carriage of a first linear actuator shown in a first position.
Figure 4:
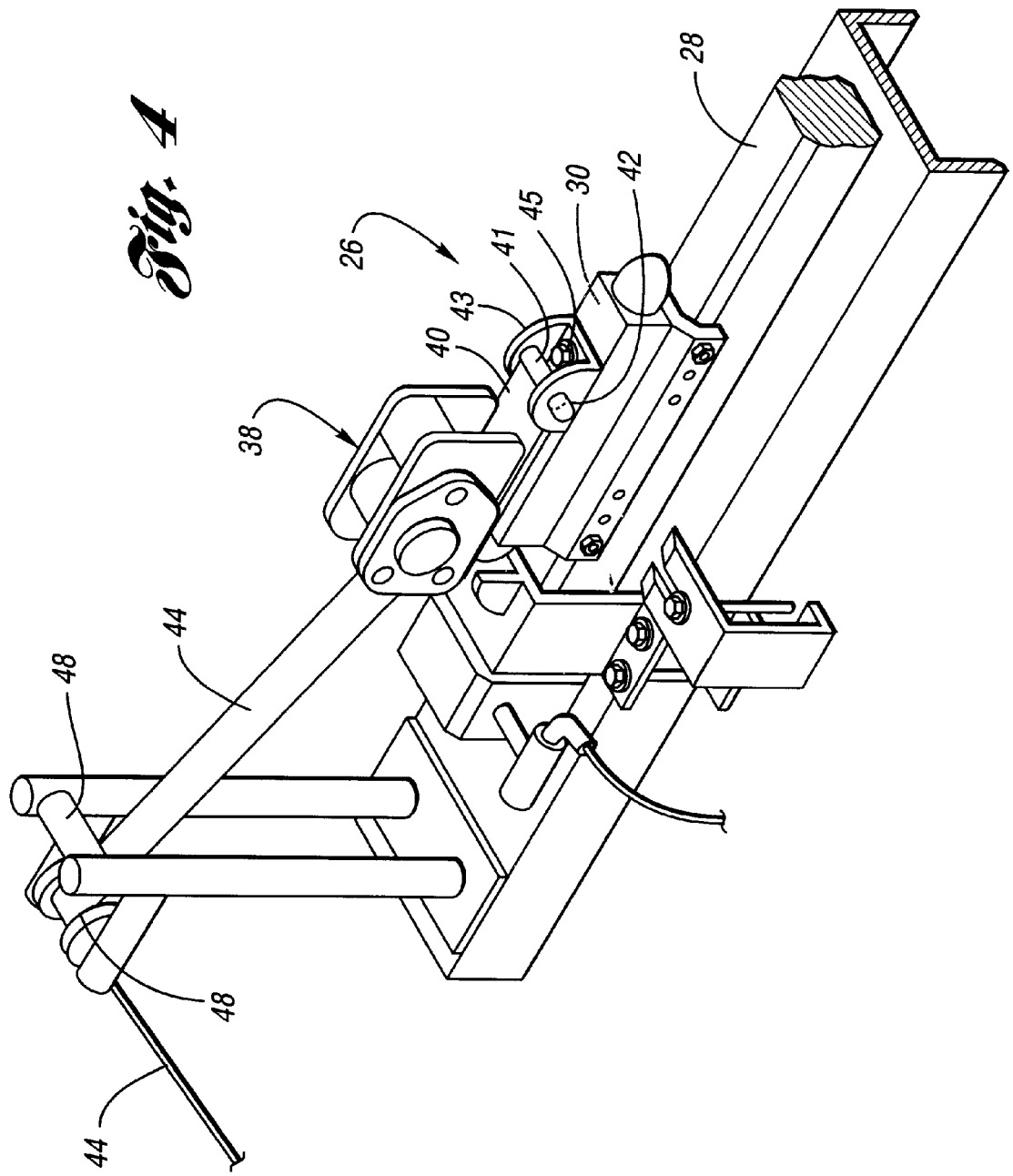
FIG. 4 is another enlarged perspective view of a portion of the apparatus of the present invention, the carriage of the first linear actuator shown in a second position.

With continued reference to FIGS. 1 and 2 and additional reference to FIGS. 3 through 5, the apparatus 10 of the present invention will be further described. The apparatus 10 of the present invention is shown to include a first linear actuator 26. The first linear actuator 26 includes a guide track 28 and a carriage 30. The carriage 30 is mounted to the guide track 28 for repeated movement in alternate directions (see arrow A and arrow B of FIG. 5) along a first translation axis 32 between first and second positions. The first position is shown in FIGS. 2 and 3. The second position is shown in FIGS. 1 and 4. In the exemplary embodiment, the first linear actuator 26 is conventional in construction and pneumatically controlled for translating the carriage 30 between the first and second positions. One suitable linear actuator 26 is commercially available from Norgren of Rockford, Illinois. It will be understood by those skilled in the art that other types of linear actuators may be incorporated. Explaining further, it will be understood that gear or hydraulically actuated devices may be alternatively incorporated.

The guide track 28 of the first linear actuator 26 is shown secured to a floor pan 36 of the motor vehicle with a plurality of mounting brackets 37. Alternatively, any manner of securing the guide track 28 to the motor vehicle 12 may be employed. As illustrated, the first linear actuator 32 is disposed within an interior of the motor vehicle 12 and oriented substantially parallel to a longitudinal axis of the motor vehicle 12. The body-in-white state of the motor vehicle 12 provides sufficient room for accommodating the first linear actuator 26.

The apparatus 10 of the present invention further includes a tensioner 38 attached to and carried by the carriage 30 of the first linear actuator 26. The tensioner 38 is illustrated to include a spool 39 rotatably about a pivot axis 42 which is generally perpendicular to the first translation axis 32. The tensioner 38 is conventional in construction and is attached to the carriage 30 in any manner well known in the art. In the embodiment illustrated, tensioner 38 includes a lower plate 40 which at a rear end is welded to a cylindrical sleeve 41. A pin 42 passes through a pair of ears of a mounting bracket 43 which is secured to the carriage by a bolt 45. The pin 42 can be removed for quick and easy maintenance or replacement of the tensioner 38. Suitable tensioners are conventionally used for coiling seat belt webbings of occupant restraint systems.

The apparatus 10 of the present invention is further illustrated to include a first flexlble coupler 44. The first flexible coupler 44 includes a first end 46 attached to the spool 40 of the tensioner 38 and a second end 49 attached to an Interior side of the liftgate 14 adjacent the lower edge 18. In the exemplary embodiment, the flexible coupler 44 is an Inelastic belt such as a seat belt webbing. Alternatively, it will be understood that inelastic cords, ropes or other flexible material may be employed in place of the belt. A plurality of rollers 48 are employed along the length of flexible coupler 44. The rollers 48 function to maintain a relatively constant orientation of Me flexible coupler 44 as the carriage 30 is translated between its first and second positions and the liftgate 14 is articulated between its open and closed positions. The particular combination of rollers 48 employed is but one configuration suitable for use with the teachings of the present invention.

When the liftgate 14 is in its open position, translation of the carriage 30 from its second position or rear position (shown in FIG. 1) to its first position or forward position (shown in FIG. 2) operates to articulate the liftgate 14 to its closed position (shown in FIG. 2). When the carriage 30 returns from its first position to its second position, slack in the flexible coupler 44 is taken up by the tensioner 38. Explaining further, the tensioner 38 maintains a tension within the flexible coupler 44. As a result, the flexible coupler 44 is kept from tangling, thereby increasing reliability and correspondingly decreasing down time of the cycle testing.

The apparatus 10 of the present invention is illustrated to further include a second linear actuator 50 having a guide track 52 and a carriage 54 mounted to the guide track 52 for movement in alternative directions (see arrows C and D in FIG. 1) along a second translational axis 56 between first and second positions. In the embodiment illustrated, the second translational axis 56 is oriented vertically and substantially perpendicular to the first translational axis 32. The first position is shown in FIG. 2. The second position is shown in FIG. 1. Again, a suitable linear actuator is commercially available from Norgren of Rockford, Ill.

The apparatus 10 of the present invention further includes a second flexible coupler 58. The second flexible coupler 58 includes a first end 60 attached to the carriage 54 of the second linear actuator 50 and a second end 62 attached to the latch 24 of the liftgate 14. Again, the flexible coupler 58 is preferably an inelastic belt. In the particular embodiment illustrated, the second flexible coupler 58 is not attached to the carriage 54 of the second linear actuator 50 through a tensioner. However, in certain applications, it may be desired to do so.

In operation, translation of the carriage 54 of the second linear actuator 50 from the first position to the second position operates to release the latch 24 and initiate movement of the liftgate 14 away from its dosed position. Continued articulation of the liftgate 14 to the open position is facilitated by a pair of conventional prop rods 63 (shown in FIG. 1). Pneumatic actuation of the first and second linear actuators 26 and 50 is coordinated in a conventional manner to facilitate cycle testing of the liftgate 14.

With continued reference to FIGS. 1–5 and additional reference to FIG. 6, a preferred method of the present invention will now be described. In a first general step 110, the present invention includes providing a first linear actuator 26 which includes a guide track 28 and a carriage 30 mounted to the guide track 28 for repeated movement in alternate directions along a first translational axis 32 between first and second positions.

In a second general step 120, the present invention includes interconnecting a closure panel 14 of a motor vehicle 12 to the carriage 30 of the first linear actuator 26 with a first flexible coupler 44. In one application, the first flexible coupler is a belt 44 which is attached to a liftgate 14 adjacent a lower edge 18 thereof.

In a third general step 130, the present invention includes repeatedly cycling the carriage 30 of the first linear actuator 26 between first and second positions.

In a fourth general step 140, the present invention provides maintaining a tension in the first flexible coupler 44 as the carriage 30 of the first linear actuator 26 is cycled between the first and second positions.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for cycle testing a closure panel of a motor vehicle In combination with the motor vehicle, the closure panel coupled to a body of the motor vehicle for articulation about a pivot axis, the closure panel including first and second laterally spaced apart edges, the first edge being adjacent the pivot axis and the second edge carrying a latch for releasable attachment to the body, the apparatus for cycle testing comprising:

a first linear actuator having a guide track and a carriage mounted to the guide track for repeated movement in alternate directions along a first translation axis between first and second positions;

a tensioner coupled to the carriage of the first linear actuator for movement therewith; and a first flexible coupler having a first end attached to the tensioner and a second end attached to the closure panel adjacent the second edge;

the tensioner operative for maintaining a tension in the first flexible coupler as the carriage is cycled between the first and second positions.

2. The apparatus for cycle testing a closure panel of a motor vehicle of claim 1, wherein the first flexible coupler is a belt.

3. The apparatus for cycle testing a closure panel of a motor vehicle of claim 1, wherein the second end of the first flexible coupler is attached to an interior side of the closure panel.

4. The apparatus for cycle testing a closure panel of a motor vehicle of claim 1, wherein the pivot axis is horizontal.

5. The apparatus for cycle testing a closure panel of a motor vehicle of claim 4, wherein the closure panel is a liftgate.

6. The apparatus for cycle testing a closure panel of a motor vehicle of claim 1, further comprising:

a second linear actuator having a guide track and a Wage mounted to the guide back for repeated movement in alternate directions along a second translation axis between first and second positions; and a second flexible coupler having a first end attached to the carnage of the second linear actuator and a second end attached to the closure panel adjacent the second edge, wherein the second linear actuator is arranged to open the closure panel and have the first linear actuator move from its first position to its second position as the second linear actuator moves from its first position to its second position along the second translational axis, and the first linear actuator is arranged to close the closure panel and have the second linear actuator move from its second position to its first position as the first linear actuator moves from its second position to its first position along the first translational axis.

7. The apparatus for cycle testing a closure panel of a motor vehicle of claim 6, wherein the first translation axis is substantially perpendicular to the second translation axis.

8. A method of cycle testing a liftgate of a motor vehicle between an open position and a closed position, the liftgate coupled to a body of the motor vehicle for articulation about a horizontal pivot axis, the method comprising the steps of:

providing a first linear actuator having a guide track and a carriage mounted to the guide track for repeated movement in alternate directions along a first translation axis between first and second positions;

mounting a tensioner to the carriage of the first linear actuator for movement therewith;

interconnecting a lower edge of the liftgate to the carriage of the first linear actuator with a first flexible coupler;

repeatedly cycling the carriage of the first linear actuator between the first and second positions; and maintaining a tension in the first flexible coupler as the carriage of the first linear actuator is cycled between the first and second positions.

9. The method of cycle testing a liftgate of a motor vehicle between an open position and a closed position of claim 8, wherein the first flexible coupler is a belt.

10. The method of cycle testing a liftgate of a motor vehicle between an open position and a closed position of claim 9, wherein the step of maintaining a tension in the first flexible coupler comprises the step of coiling the first flexible coupler about an axis perpendicular to the first translation axis.

11. The method of cycle testing a liftgate of a motor vehicle between an open position and a closed position of claim 8, further comprising the step of mounting the first linear actuator within an interior of the motor vehicle.

12. The method of cycle testing a liftgate of a motor vehicle between an open position and a closed position of claim 8, further including the steps of:

a second linear actuator having a guide track and a carriage mounted to the guide track for repeated movement in alternate directions along a second translation axis between first and second positions; and a second flexible coupler having a first end attached to the carriage of the second linear actuator and a second end attached to the closure panel adjacent the second edge.

* * * * *